United States Patent [19]

Erdman

[11] Patent Number: 5,187,427
[45] Date of Patent: Feb. 16, 1993

[54] STATIC REACTIVE POWER COMPENSATOR

[75] Inventor: William L. Erdman, Brentwood, Calif.

[73] Assignee: U.S. Windpower, Inc., Livermore, Calif.

[21] Appl. No.: 800,643

[22] Filed: Nov. 27, 1991

[51] Int. Cl.$^5$ ............................................. G05F 1/30
[52] U.S. Cl. ...................................... 323/207; 363/98
[58] Field of Search ................... 323/205, 207; 363/95, 363/97, 98

[56] References Cited

U.S. PATENT DOCUMENTS

| | | |
|---|---|---|
| 3,829,759 | 8/1974 | Thorborg. |
| 3,959,719 | 5/1976 | Espelage. |
| 3,999,117 | 12/1976 | Gyugi et al.. |
| 4,174,497 | 11/1979 | Depenbrock. |
| 4,251,735 | 2/1981 | Coleman ............................ 363/95 X |
| 4,251,736 | 2/1981 | Coleman ............................ 363/95 X |
| 4,348,631 | 9/1982 | Gyugi et al.. |
| 4,410,807 | 10/1983 | Buffington. |
| 4,780,660 | 10/1988 | Shima et al. ........................ 323/207 |
| 4,954,726 | 9/1990 | Lipman et al.. |
| 4,994,981 | 2/1991 | Walker et al.. |

OTHER PUBLICATIONS

Ertl, H. et al., "Analysis of Different Current Control Concepts for Forced Commutated Rectifier", Power Conversion International Conference, Jun. 17–19, 1986.

*Primary Examiner*—Emanuel T. Voeltz
*Attorney, Agent, or Firm*—Blakely, Sokoloff, Taylor & Zafman

[57] ABSTRACT

An apparatus and method for compensating a polyphase electrical power supply for reactive power loads on an AC supply line is disclosed. The static VAR compensator disclosed herein can provide a selectable, constant amount of VARs to compensate for reactive loads on the line, or alternately provide a fixed phase angle. The static VAR compensator may be controlled to compensate for fluctuating reactive loads. The static VAR compensator includes a transistorized inverter, connected between the AC supply and a constant voltage, that has switches to control the instantaneous current on each phase line of the AC power supply. By modulating the inverter switches at a high frequency, the instantaneous currents flowing through each of the phase lines can be modulated for precise control of the real and the reactive power. A voltage waveform is obtained from each phase of the utility grid, and used as a reference waveform. The control system applies the reference waveform to create two waveforms: a real waveform and an imaginary waveform for each phase. The imaginary waveform is multiplied by a VAR multiplier $M_1$ to supply the desired number of VARs, the real waveform is multiplied by a real multiplier $M_2$ that is derived to control the constant voltage source, and resultant waveforms are added together to provide a current control waveform for each phase that is applied to the inverter through a current regulator and drive circuits.

15 Claims, 7 Drawing Sheets

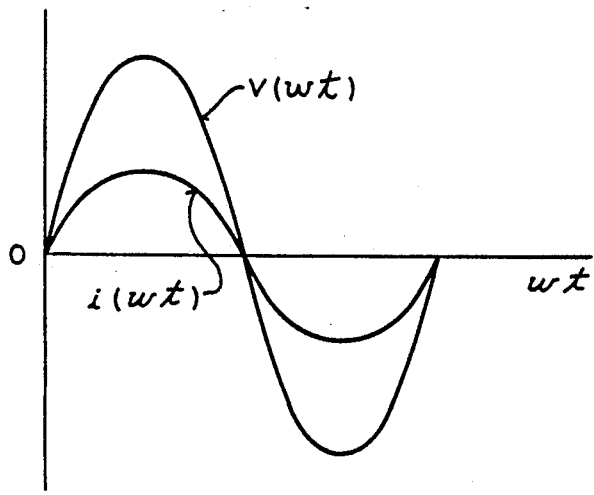
FIG _ 1A
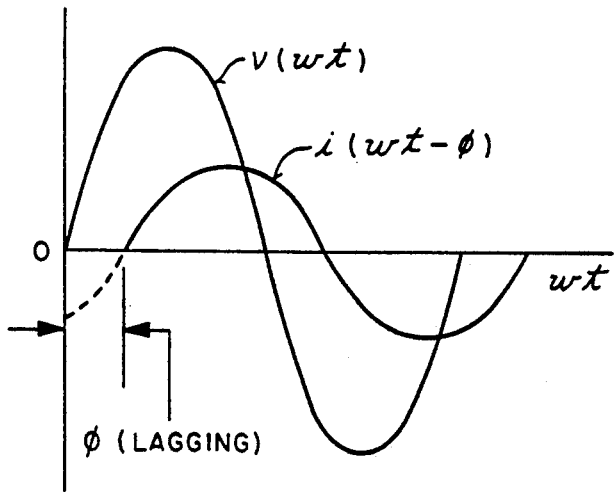
FIG _ 1B
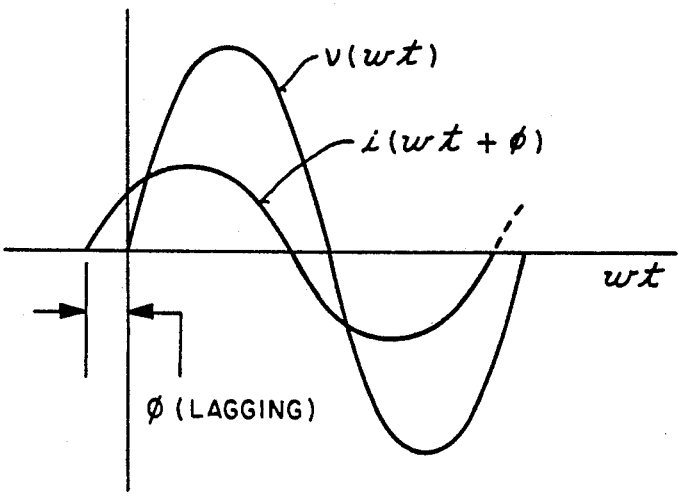
FIG _ 1C

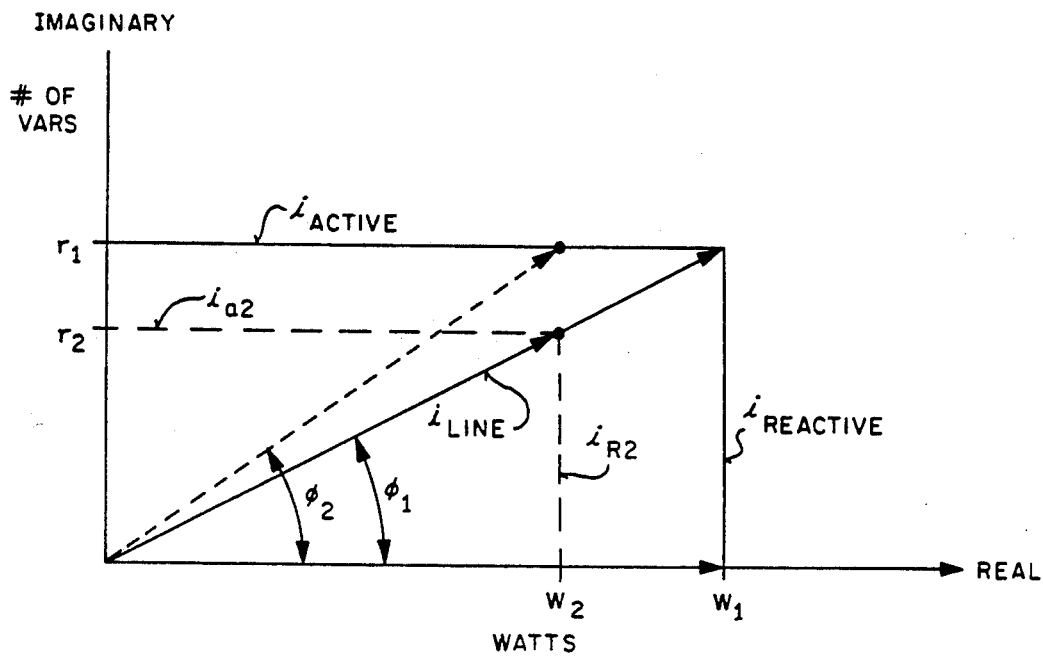
FIG_2
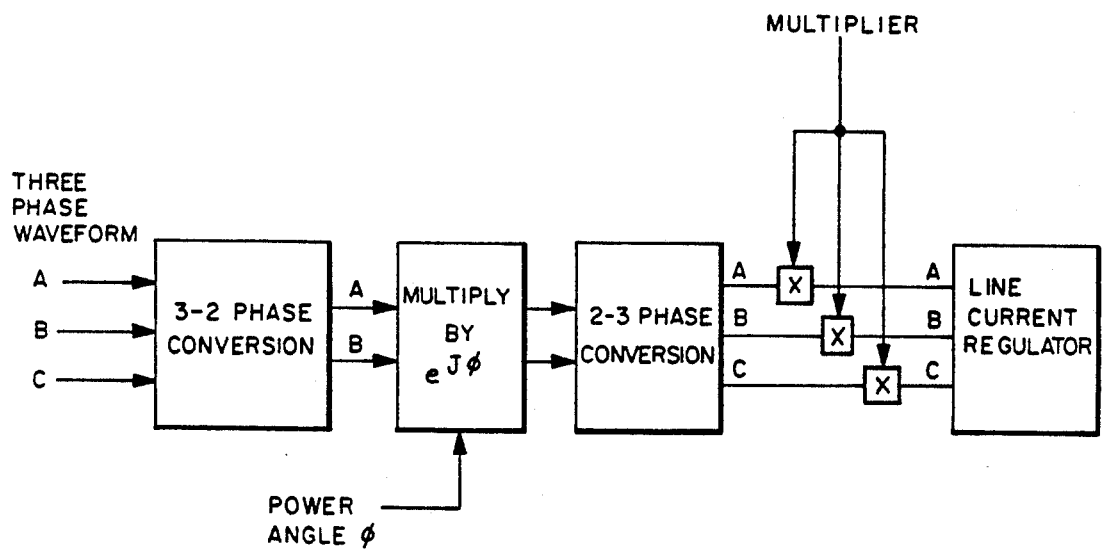
FIG_3

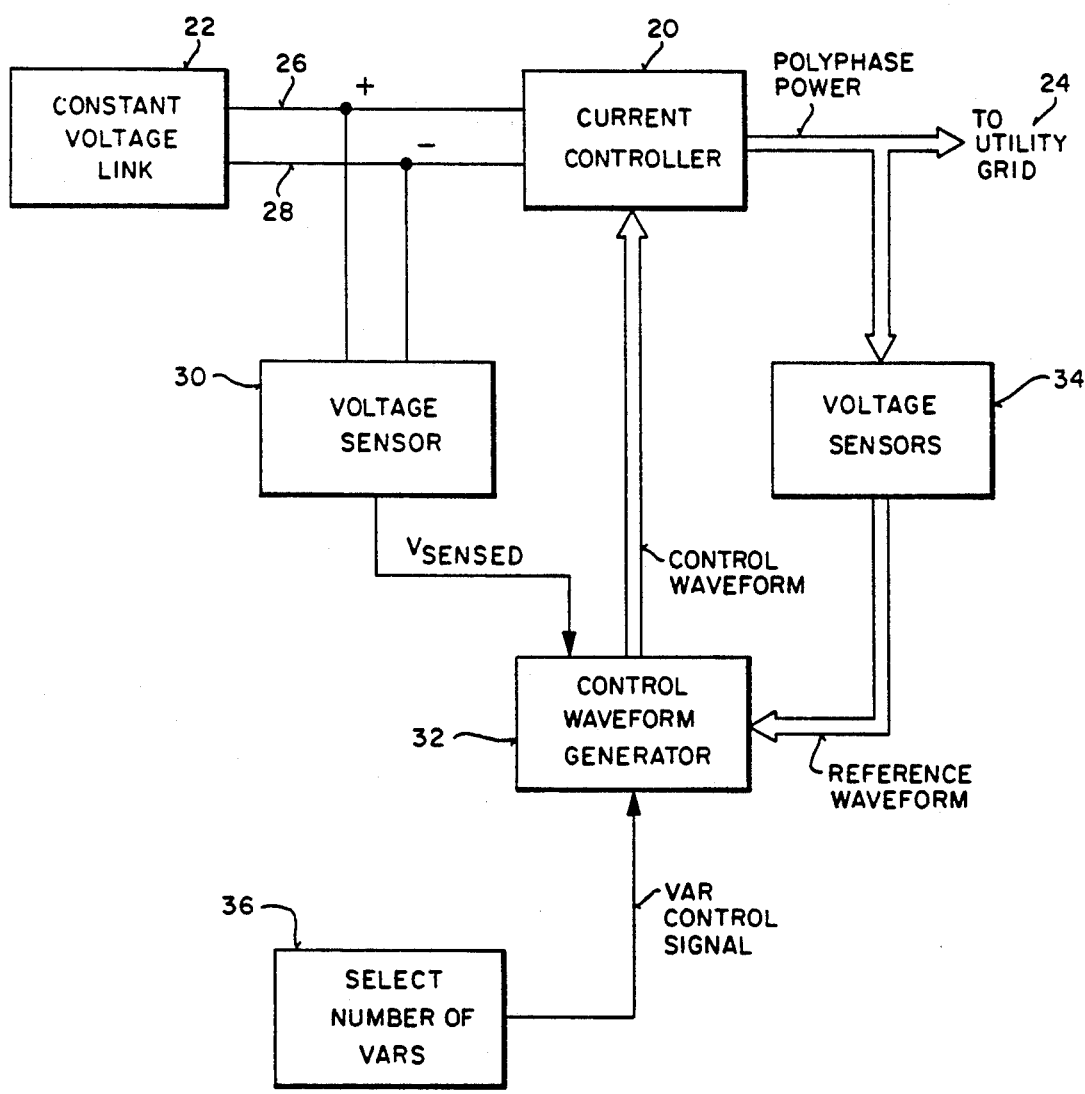

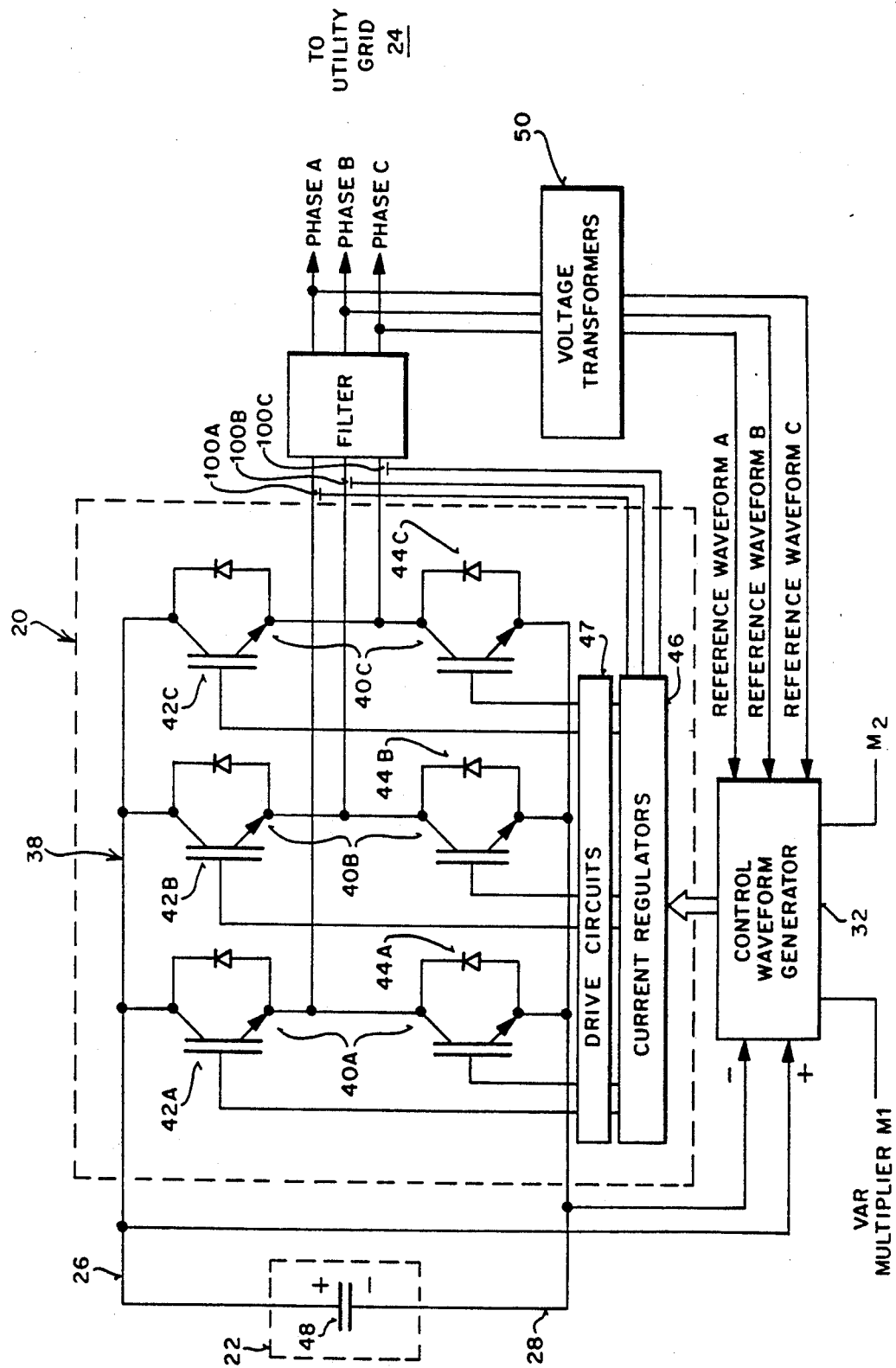

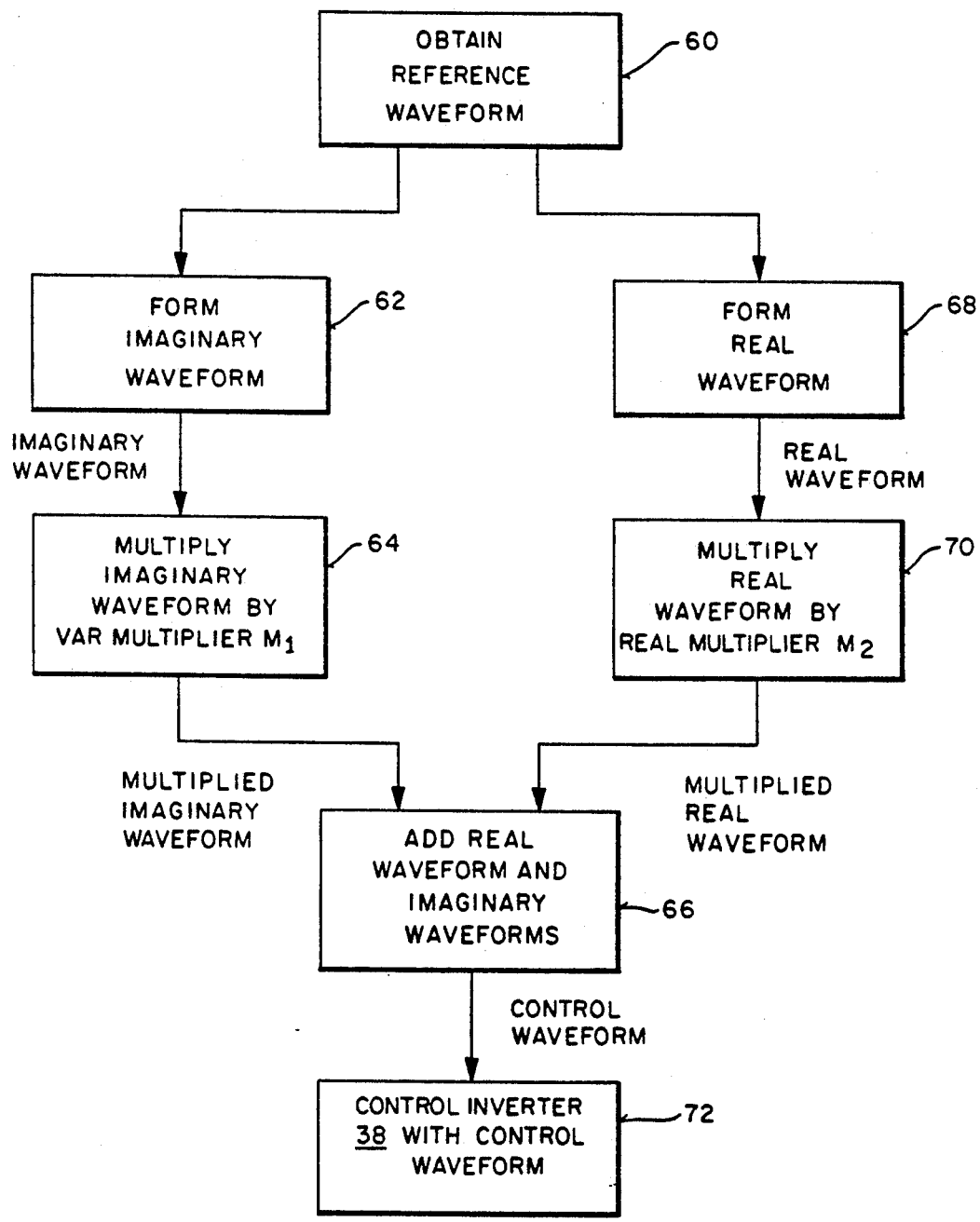

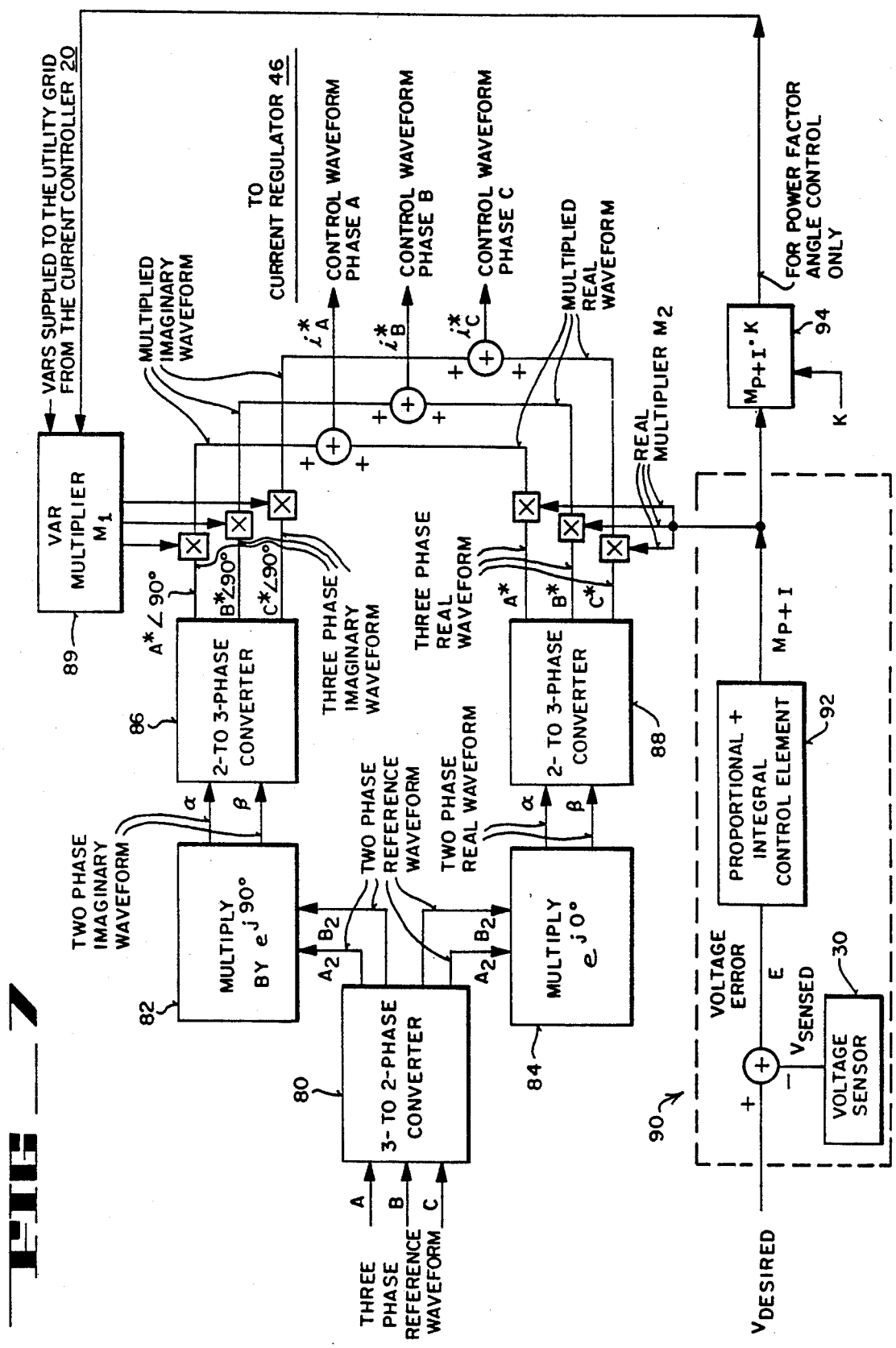

ns: "Variable
STATIC REACTIVE POWER COMPENSATOR

CROSS REFERENCE TO RELATED APPLICATIONS

Cross-reference is made to the following commonly-assigned, copending patent applications: "Variable Speed Wind Turbine with Reduced Power Fluctuation and a Static Var Mode of Operation", Ser. No. 071,799,416 filed on the same date as the present application; "Low-Noise Power Bus", Ser. No. 07/728,112 filed on Jul. 10, 1991; "Variable Speed Wind Turbine", Ser. No. 07/649,567 filed on Feb. 1, 1991; now U.S. Pat. No. 5,083,039 issued Jan. 21, 1992; and "Four Quadrant Motor Controller", Ser. No. 07/660,050 filed on Feb. 22, 1991.

BACKGROUND OF THE INVENTION

1. Field of the Invention

The present invention relates to electric power. More specifically, the present invention relates to selectable compensation of electric power supplies for reactive loads that produce or absorb VARs.

2. Description of Related Art

Power grids transmit electrical energy from generating facilities to end users. Electrical energy is transmitted optimally if the user's loads are resistive. However, the typical load experienced by a power grid is at least partially reactive (inductive or capacitive). For example, a highly inductive load can be produced by a manufacturing facility that has many electric motors. From the standpoint of an electrical grid, reactive loads (VARs) cause problems in transmission of power and can affect the quality of electrical power supplied to the consumer. Furthermore, excessive VARs put undue stress on transmission lines, transformers, and other electrical apparatus.

Power utilities and consumers would both benefit from a device that could adjust the phase of the electrical current to be in phase with the voltage. Such a device would be useful for power utilities, as well as for large electrical users with reactive loads. Furthermore, such a device would protect other electrical users on the grid from power variations that could be destructive.

With reference to FIGS. 1A, 1B, and 1C, electrical power has at least two characteristics: voltage and current. In a typical AC electric grid, both voltage and current vary over time. When the instantaneous voltage is multiplied by the current, the result is the instantaneous power. In a commercial electrical grid, voltage has the form of a sine wave, one cycle of which is illustrated in FIG. 1A. At 60 Hz, the cycle repeats sixty times every second. Ideally, voltage and current waveforms are exactly in phase, as illustrated in FIG. 1A, with $v(\omega t)$ representing the time-varying voltage waveform and $i(\omega t)$ representing the time-varying current waveform. However, due to reactive (i.e., inductive or capacitive) loads, the voltage waveform $v(\omega t)$ may not be in phase with the current waveform as illustrated with reference to FIGS. 1B and 1C. The amount by which the current lags or leads the voltage can be quantified by a power factor angle $\phi$, which is representative of the fraction of a cycle by which the current leads or lags the voltage. A cycle is $2\pi$, or 360°, and the power factor angle $\phi$ is the difference between the cycles of the current and the voltage, such as $\pi/2$ or 90°. With respect to a constant voltage waveform $v(\omega t)$, a lagging current (i.e., a current waveform that is behind voltage) is illustrated as $I(\omega t - \phi)$ in FIG. 1B, and a leading current (i.e., a current waveform that occurs in front of the voltage) is illustrated as $i(\omega t + \phi)$ in FIG. 1C.

FIG. 2 is a phasor representation of an exemplary voltage and current in a circuit. The real components are plotted on the x-axis, and imaginary components are plotted on the y-axis. The voltage vector is shown parallel to the real axis, and the current is leading the voltage by an angle $\phi$. The line current, $i_{line}$, is the actual current on the line, and it has two components, a real and an imaginary component. The real component of the current is labeled $i_{active}$, and is termed the "active current". The imaginary component, labeled $i_{reactive}$, is the "reactive current".

The current, voltage, and power have specific relations:

line current * voltage = apparent power (in volt-amperes)

active current * voltage = real power (in watts)

reactive current * voltage = reactive power (in VARs)

Thus, it can be seen that, in the presence of reactive impedances, the product of voltage and current does not indicate the real power used by the circuit. The measured power is "apparent power", and is usually expressed in terms of volt-amperes or "VARs" for volt-ampere reactive. An additional term, a "power factor" is often used for calculation and descriptive purposes. To calculate the real power, which is measured in watts, the apparent power can be multiplied by the power factor. The power factor may be defined as the ratio between the true and apparent power:

$$\text{power factor} = \frac{\text{true power}}{\text{apparent power}} = \frac{\text{watts}}{\text{VARs}}$$

The power factor may also be defined as the ratio between the active current and the line current:

$$\text{power factor} = \frac{\text{active current}}{\text{line current}} = \cos \phi$$

Practical circuits have a power factor between 0 and 1 (i.e., a power factor $\phi$ between 0° and 90°). A purely reactive circuit will have a power factor of 0 (a power factor angle $\phi$ of 90°), and a purely resistive circuit will have a power factor of 1 (a power factor angle $\phi$ of 0°). Either the power factor or the power factor angle $\phi$ of a circuit indicate the relationship between the real power and the apparent power.

The power factor angle $\phi$ between the voltage and current is important from the standpoint of power delivery. From the perspective of a load, power transfer is most efficient when the voltage is in phase with the current. Conversely, from the perspective of a grid, the amount of power that can be delivered into a number of distributed loads is dependent upon the power factor angle between the voltage and current for each of those respective loads. The power factor angle $\phi$ will be zero, as illustrated in FIG. 1A, only in the unusual instance when the loads are purely resistive. In that instance, all power is being delivered to the load. If the load includes reactive impedances such as inductances or capacitances, then a phase shift will occur.

Compensation of reactive loads can be accomplished conventionally by capacitor banks. However, such capacitor banks have disadvantages: they are large and expensive to build, they generally serve no purpose other than reactive load compensation, and they provide a fixed, non-selectable amount of VARs. In addition to capacitor banks, another device for reactive load compensation is the rotating synchronous condenser, which compensates for a reactive load by operation at a leading power factor. A rotating synchronous condenser can provide a variable amount of VARs, however at a considerable expense in cost.

Other static VAR compensators have been proposed for reactive power correction in a static mode of operation. For example, phase shifting filter circuits may be used to change the power factor angle $\phi$. As another example, Gyugyi et al. in U.S. Pat. No. 3,999,117 discloses a static VAR generator circuit for three phase AC that generates time delayed firing angles for thyristor controlled inductors which are utilized with parallel capacitors. Specified phase angles can be maintained; for example it is stated that a phase angle of zero is possible.

Although controlling the power factor angle $\phi$ is useful in some applications, it does not automatically provide a fixed number of VARs. As an example, FIG. 2 shows a real voltage vector having a length $v_1$. With the power factor angle $\phi_1$, $r_1$ represents the amount of VARs drawn from the line. If the real power were to be changed to be $w_2$ while maintaining the power factor angle $\phi_1$, then $r_2$ represents the amount of VARs drawn from the line. Thus, the effect of a reduction in watts is a direct reduction in the number of VARs at the output. In order to maintain a constant number of VARs, it would be necessary to change the power factor angle to the power factor angle $\phi_2$, shown on FIG. 2. Thus, as the real power changes, the power factor angle $\phi$ must be changed in order to maintain a constant number of VARs. In this case, the change in real power from $w_1$ to $w_2$ must be accompanied by a power factor angle change from $\phi_1$ to $\phi_2$ in order to maintain the constant number of VARs $r_1$.

Some proposed static VAR compensators include inverters for converting from a DC power source into a constant frequency alternating current (AC) such as that supplied by a utility grid. In those static VAR compensators, the inverter is based on technology using the silicon controlled rectifier (SCR), a type of thyristor. These static VAR compensators are able to control reactive power and real power to some extent. However, SCR based inverters have problems, including a comparatively low switching frequency resulting in a high harmonic content, and an inherent characteristic that renders them impossible to shut off unless the device voltage is reversed. Furthermore, the SCR-based inverters are generally voltage controlled and as a result, undesirable current transients appear that may last for seconds or more. These and other problems make it difficult to design an SCR-based inverter that can accurately produce the desired waveform without substantial distortion.

Another type of proposed static VAR compensator includes a cycloconverter, which converts between a variable frequency AC and a constant frequency AC. Problems with the cycloconverter include the undesirable current transients that result from the voltage control, as in the SCR based technology discussed above, which may last for several seconds. Also, cyclconverters generate low order harmonics which are difficult to filter out. As an additional disadvantage, cycloconverters require a very complicated control scheme and a large number of semiconductor devices which translate into increased expense and increase the probability of breakdowns and therefore decrease reliability.

Neither the SCR-based inverters, nor the cycloconverters can control the instantaneous current on each phase line; that is, neither can directly regulate the current on an instantaneous basis. Therefore, it is difficult for those devices to provide the necessary relationship between the real current, the reactive current, and the voltage on the power grid. Instead of controlling current directly, these devices are forced to control voltage quantities in the phase relationship between the voltage quantities and only indirectly achieve their goal of controlling the current. It would be an advantage to provide a static VAR compensator that can directly control the current, in order to provide instantaneous current control in accordance with the desired current, in order to produce the appropriate balance between real power and reactive power.

It would be a further advantage is the reactive power could be selected independently of the real power, so that reactive power can be provided while at the same time utilizing only a minimum of real power. Furthermore, it would be an advantage if such a static VAR compensator could alternatively control the power factor angle, which is a combination of the real power and the reactive power in a particular ratio.

SUMMARY OF THE INVENTION

The present invention provides an apparatus and method for compensating a polyphase electrical power supply for reactive power loads on the supply line. Particularly, a static VAR compensator in accordance with the present invention can provide a selectable, constant amount of VARs to compensate for arbitrary reactive loads on the line. For example, a steady amount of VARs can be supplied to compensate for large inductive loads placed on the utility grid by manufacturers. Alternately, the VARs may be controlled in a varying manner to compensate for fluctuating reactive loads, a feature that can be utilized to provide a substantially constant high power factor to the utility during those fluctuating reactive loads.

In the described embodiment, the control system supplies VARs to a three phase power supply. However, in other embodiments a controller in accordance with the present invention could provide VARs to any power supply including a single phase power supply or a power supply having two or more phases.

In the described embodiment, the control system supplies a current control signal or waveform to a transistorized inverter having a pair of solid-state switches that are directly connected to each phase line of the polyphase power supply. The solid-state switches in the transistorized inverter are also connected to a constant voltage energy storage device that provides a substantially constant reference voltage to the switches. By modulating the switches at a high frequency, the transistorized inverter controls instantaneous currents flowing through each of the phase lines for precise control of the real and the reactive power.

The control system uses a voltage waveform as a reference waveform for further operations. The voltage waveform is obtained from conventional voltage transformers connected to each phase of the utility grid. The control system applies the reference waveform to create, for each phase, two waveforms: a real waveform and an imaginary waveform. The real waveform includes the reference waveform substantially unchanged, and the imaginary waveform includes the reference waveform rotated by 90°. The imaginary waveform is multiplied by a VAR multiplier $M_1$ that is selected with a VAR control signal to supply the desired number of VARs. The real waveform is multiplied by a real multiplier $M_2$. Preferably, the multiplier $M_2$ is selected to control the voltage link at a constant value. The multiplier $M_2$ is calculated by use of a real waveform controller that includes a proportional-30 integral control element that monitors an error between the desired reference voltage and the actual reference voltage. The real waveform controller, in some embodiments, also includes a feature that provides a constant power factor angle as an alternative to a fixed number of VARs. In these embodiments, an additional constant, defined as K, is multiplied by $M_2$, the output of the proportion+integral controller and then supplied as the VAR multiplier $M_1$ in lieu of the previously described multiplier $M_1$. The value for K is supplied by an operator, thus allowing the operator to control the power factor angle.

The multiplied imaginary waveform and the multiplied real waveform are added to provide a current control waveform for each phase. The current control waveform is applied to a current regulator and a drive circuit that drives the switches of the inverter circuit to provide the instantaneous current specified by the current control waveform. Thus, reactive power can be specified and controlled by directly controlling the currents through each of the phase lines.

BRIEF DESCRIPTION OF THE DRAWINGS

FIGS. 1A, 1B, and 1C are graphical depictions of a cycle of a sinusoidal waveform, FIG. 1A illustrates a current in phase with the voltage, FIG. 1B illustrates a current lagging the voltage, and FIG. 1C illustrates a current leading the voltage.

FIG. 2 is a vector representation of a line current leading a voltage illustrating the real and the reactive components of current and voltage.

FIG. 3 is a block diagram of a VAR compensation system disclosed in a copending, commonly-assigned patent application.

FIG. 4 is a block diagram of a static VAR compensator in accordance with the present invention.

FIG. 5 is a schematic diagram of a preferred embodiment of the static VAR compensator in accordance with the present invention.

FIG. 6 is a flow chart illustrating operation of a controller of the present invention.

FIG. 7 is a diagrammatic illustration of a preferred embodiment of a controller.

DETAILED DESCRIPTION OF THE INVENTION

Figure 8:
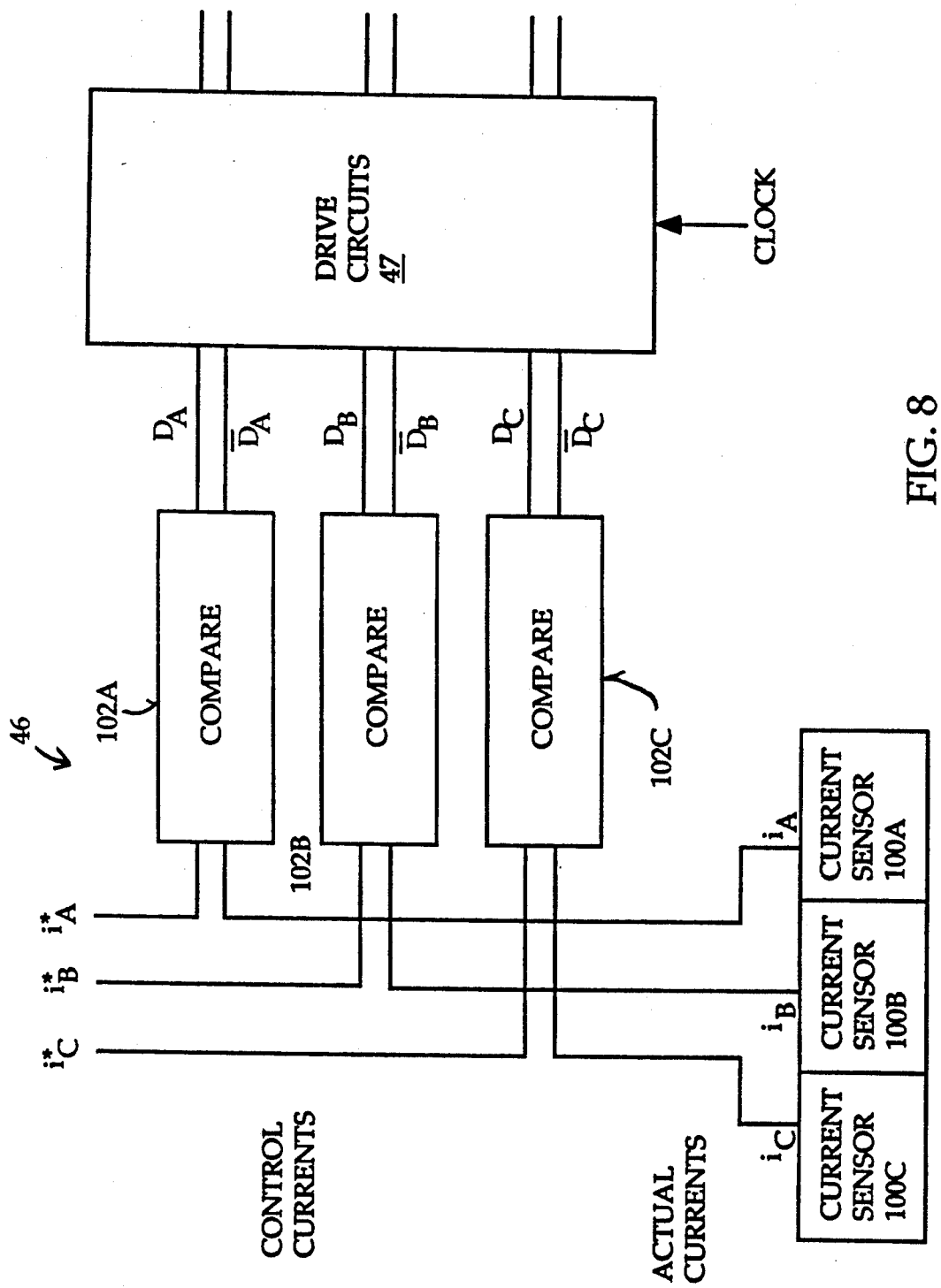
FIG. 8 is a block diagram of a delta modulator current controller for controlling inverter currents in accordance with the current control waveform.

The preferred embodiment of invention is best understood by reference to the figures wherein like parts are designated with like numerals throughout. The invention is first described below with reference to FIG. 4, which is a block diagram, and FIG. 5 shows the preferred embodiment in more detail.

Reference is made to FIG. 3, which is a block diagram of a fixed power factor angle static VAR compensator that is disclosed in related applications Ser. No. 07/649,567 entitled "Variable Speed Wind Turbine," and Ser. No. 07/660,050 entitled "Four Quadrant Motor Controller," specified above. A three-phase waveform signal including Phase A, Phase B, and Phase C is provided into a conventional three- to two-phase converter. The two-phase output waveforms are then multiplied by $e^{j\phi}$, where $\phi$ is the power factor angle. The two phases are then converted back to three phases, and the outputs are multiplied by a multiplier. The multiplied waveforms are then provided to a current regulator, which regulates currents on the three phase lines.

In order to maintain an approximately constant number of VARs in changing real power conditions, feedback may be utilized with the static VAR compensator disclosed in FIG. 3. In other words, the voltage, current, and real power can be measured with feedback, and the power factor angle continually adjusted to maintain the desired number of VARs. However, adjustment of the power factor angle changes the amount of real power that must be dissipated, possibly in very appreciable amounts. Dissipating large amounts of real power has disadvantages. For example additional equipment is required, such as large resistors with heat sinks. Also, dissipation of real power wastes electrical energy in large amounts.

In the static VAR compensator of FIG. 3, it would be desirable to maintain the power factor angle $\phi$ at 90° coincident with the imaginary axis. However in practice, maintaining the real power at zero while maintaining a power factor angle of 90° is not attainable, because some small amount of real power must be passed.

Due to difficulties in control of the real power, the static VAR compensator of FIG. 3 is not operable at 90°. Instead, this static VAR compensator can be operated with stability only at several degrees from 90°, for control reasons. With a power factor angle close to 90°, there is less precision, and more likelihood of losing control. However, as the power factor angle goes further from 90°, other disadvantages become more pronounced, these disadvantages including consumption of increasing amounts of real power. Thus, a tradeoff exists between real power consumption and precision in selecting the number of VARs. Real power consumption is minimized if the power factor angle is close to 90°, but this would means less precise control of the number of VARs. More precise control of the number of VARs could be accomplished by selecting a smaller power factor angle, but this would require a larger real power consumption.

Reference is made to FIG. 4 which shows a current controller 20 positioned between an energy storage device 22 having a constant voltage output and a utility grid 24. The energy storage device 22, described in further detail below, may include a capacitor or a battery. The output from the current controller 20 is delivered to a polyphase power supply, which in the preferred embodiment is a three-phase power supply typical of the utilities in the United States. However, any other polyphase power supply may be controlled by the present invention.

Between the energy storage device 22 and the current controller 20, the voltage across a+v rail 26 and a−v rail 28 is sensed with a conventional voltage sensor 30. The voltage sensor 30 provides a voltage signal to a control waveform generator 32. The control waveform generator 32 outputs a control waveform in a manner described in detail below. The control waveform generator 32 uses a reference waveform for each phase provided from the voltage appearing on each phase line of the utility grid 24. The voltage is sensed by any conventional voltage sensor 34. outputting a time varying signal indicative of the voltage on each phase. The voltage sensors 34 provide a reference waveform for the control waveform generator 32. The number of VARs is selected, as illustrated in the box 36, and applied to the control waveform generator 32.

Reference is made to FIG. 5 which shows a schematic diagram of the static VAR compensator of the present invention. The current controller 20 includes an inverter shown generally at 38 for a three-phase power supply. Specifically, the inverter 38 includes three switch pairs, including a phase A switch pair 40A, a phase B switch pair 40B, and a phase C switch pair 40C. Each switch pair 40A, 40B, 40C includes an upper switch 42 positioned between the +v rail 26 and its respective phase line, and a lower switch 44 connected between the −v rail 28 and their respective phase line. As is known in the art, the switches 42, 44 are operated in complimentary fashion; i.e., only one of the switches in a pair will be open at a point in time during operation of the inverter 38. The inverter 38 is driven by a current regulator 46 and a conventional drive circuit 47 which will be described in more detail below. Generally the current regulator 46 is controlled by a control waveform for each phase.

In FIG. 5, the energy storage device 22 includes a capacitor 48. However, other energy storage means may be substituted for the capacitor 48. In a preferred embodiment, the capacitor 48 is used for cost saving reasons. In other preferred embodiments, the energy storage device 22 may include a battery to store larger amounts of electrical energy. A larger energy storage device is advantageous for better control of the voltage across the voltage link, and other reasons. For example, a larger energy storage device may obviate the voltage regulating function of the controller, therefore allowing this function to be performed by a battery charge controller.

The control waveform generator 32 generates a control waveform for each phase of the output power. Specifically, a Phase A control waveform is generated that is applied through the current regulator 46 and the drive circuit 47 to control the switch pair 40A, a Phase B control waveform is generated that controls the switch pair 40B, and a Phase C control waveform is generated that controls the switch pair 40C. The inputs to the control waveform generator include the voltage sensed across the voltage rails 26, 28, a VAR multiplier $M_1$, a real multiplier $M_2$, a constant K (if appropriate), and the voltage waveform for each of the three phases. In the preferred embodiment, the voltage on each of the phases is transformed to a low level by voltage transformers 50. Specifically, the voltage waveform on phase A is transformed by the voltage transformers 50 to a reference waveform A, the voltage on phase B is transformed by the voltage transformers 50 to a reference waveform B, and the voltage on phase C is transformed by the voltage transformers 50 to a reference waveform C. Using the above inputs, a control waveform is generated by the control waveform generator 32 in accordance with the algorithms to be described with reference to FIGS. 6 and 7 below.

Reference is made to FIG. 6, which is a flowchart of the control waveform generator 32. Preferably, the steps in the flowchart are performed by digital equipment and software, however any other hardware or method may be used to accomplish the following steps. In the preferred embodiment, the control waveform is produced digitally at a rate between 8 KHz and 16 KHz, which means that the sample period for the control waveform is between 125 or 62.5 microseconds, depending upon the selected frequency.

In a box 60, a reference waveform is obtained. For purposes of clarity and explanation, FIG. 6 shows only the operations on a single phase. Based on the description herein, it should be apparent to one skilled in the art that the operations in FIG. 6 occur in parallel for each phase of the output. After the reference waveform has been obtained, as in the box 60, the reference waveform is applied to form an imaginary waveform as illustrated in a box 62. A will be described in more detail, the imaginary waveform may be obtained by rotating the reference waveform by 90°. The imaginary waveform is then applied, as illustrated in a box 64, to a multiplier $M_1$ which is calculated as will be described with reference to FIG. 7. The multiplied imaginary waveform is then added in a box 66.

On the other side of the flowchart, the reference waveform is applied to form the real waveform illustrated in a box 68. The real waveform may be substantially similar to the reference waveform. The real waveform is applied to a box 70, in which it is multiplied by a real multiplier $M_2$. The multiplied real waveform is then added to the multiplied imaginary waveform to obtain a control waveform. Applying the control waveform, as illustrated in a box 72, the inverter 38 is controlled with the control waveform in order to provide a current in accordance with the control waveform.

Reference is made to FIG. 7 which is a more detailed illustration of the control waveform generator of the present invention. Beginning from the left in FIG. 7, the 3-phase reference waveform is applied to a 3- to 2-phase converter 80.

The 3- to 2-phase converter 80 converts the 3 phases of the reference waveform to 2 phases in accordance with the following matrix equation:

$$\begin{bmatrix} A_2 \\ B_2 \\ 0 \end{bmatrix} = \begin{bmatrix} 1 & \cos(2\pi/3) & \cos(4\pi/3) \\ 0 & \sin(2\pi/3) & \sin(4\pi/3) \\ 1 & 1 & 1 \end{bmatrix} \begin{bmatrix} A \\ B \\ C \end{bmatrix} \quad (1)$$

where $A_2$, $B_2$ are the 2-phase reference quantities and A, B, and C are the 3-phase reference quantities.

The outputs of the 3- to 2-phase converter 80, i.e. the two 2-phase reference waveforms, are provided to two separate processing lines, one of which produces and processes an imaginary waveform and one of which produces and processes a real waveform. Specifically, the 2-phase reference waveform is applied to a box 82 in which each phase is multiplied by $e^{j90°}$. Similarly, the 2-phase reference waveform is applied to a box 84 in which each phase is multiplied by $e^{j0°}$ (or 1). In alternate embodiments, multiplication by 1 may be unnecessary, and the reference waveform may be used directly to form the real waveform at the output of the box 88 without the need for 3- to 2-phase conversion and 2- to 3-phase conversion.

The output of the box 82, a 2-phase imaginary waveform, is then applied to a 2- to 3-phase converter 86 which outputs a 3-phase imaginary waveform. The 2- to 3-phase conversion is accomplished by inverting equation (1):

$$\begin{bmatrix} A^* \\ B^* \\ C^* \end{bmatrix} = \begin{bmatrix} 2/3 & 0 & 1/3 \\ -1/3 & 1/\sqrt{3} & 1/3 \\ -1/3 & 1/\sqrt{3} & 1/3 \end{bmatrix} \begin{bmatrix} A_2 \\ B_2 \\ 0 \end{bmatrix} \qquad (2)$$

Similarly, the output of a box 84, a 2-phase real form waveform, is applied to a 2- to 3-phase converter 88 to output a 3-phase real waveform.

Each phase of the 3-phase imaginary waveform is then multiplied by a VAR multiplier $M_1$ selected as illustrated in a box 89. The VAR multiplier $M_1$ has the same value for each phase. In the box 89, the VAR multiplier $M_1$ can be manually selected by an operator who is observing the number of VARs output and who adjusts the multiplier $M_1$ accordingly, to produce the desired number of VARs. The VAR multiplier can also be selected automatically by a hierarchical control loop such as a voltage regulator that can be operator controlled to provide a fixed number of VARs. Alternately, as described below, the VAR multiplier $M_1$ may be selected to provide a constant power factor angle. If the number of VARS is to be controlled directly, the number of VARs must be measured. When a multiple number of the static var compensators are in operation, for example at a site having numerous wind turbines whose electrical power is collected at central collection centers, measurement is readily performed at the collection centers. In other embodiments, the VARs can be measured elsewhere on the line connected to the VAR compensator.

The 3-phase real waveform output from the 2- to 3-phase converter 88 is multiplied by a real multiplier $M_2$ which is obtained as illustrated in a box 90 enclosed by dotted lines. The multiplier $M_2$ is preferably the same multiplier for each of the 3-phase lines. The multiplier $M_2$ is obtained in a manner that controls or regulates the voltage in the energy storage device 22 (FIG. 4), across the constant voltage lines 26, 28. The voltage sensor 30 provides a sensed voltage, $v_{sensed}$, which is subtracted from a desired voltage, $v_{desired}$ to obtain a voltage error $\epsilon$. The voltage error $\epsilon$ is applied to a proportional plug integral control element 92, which outputs a value $M_{P+1}$ with the following formula:

$$M_{P+1} = K_1 \epsilon + K_2 \int \epsilon \, dt \qquad (3)$$

$K_1$ and $K_2$ are constants selected to provide a stable DC voltage on the energy storage device 22. The constants $K_1$ and $K_2$ can be determined using conventional control techniques, such as the root-locus method, the frequency domain (Bode plot) method, or by empirically testing the device. The values for $K_1$ and $K_2$ are highly dependent upon the particular embodiment. The value $M_{P+1}$ is then applied as the real multiplier $M_2$ to the three phase real waveform.

If, instead of controlling the number of VARs, control of the power factor angle is desired, then a value K is selected to specify a predetermined power factor angle. Then, the value K is multiplied by $M_{P+1}$, as illustrated in a box 94. This product is applied to the VAR multiplier box 89. Thus, if the power factor angle is to be controlled, then the imaginary multiplier $M_1$ is proportional to the real multiplier $M_2$.

The results of the multiplication of the real waveforms and the imaginary waveforms are added to obtain the control waveforms for each phase. Specifically, the multiplied real waveform for phase A is added to the multiplied imaginary waveform for phase A in order to obtain the control waveform for phase A. Similarly for phase B and phase C, the multiplied real waveform is added to the multiplied imaginary waveform to yield a control waveform. The control waveforms for each phase are then applied to the current regulator 46 shown in FIG. 5, which controls the inverter 38 through the drive circuit 47.

Reference is again made to FIG. 5, which shows the energy storage device 22 that includes a capacitor 48. During operation of the static VAR compensator of the present invention, the capacitor 48 maintains an approximately constant voltage by controlling the amount of real power absorbed from the utility grid 24. Before operation can commence, the capacitor 48 must be "precharged" by, for example, a simple resistive precharge circuit.

In accordance with the present invention, the static VAR compensator can provide a fixed number of VARs to compensate for reactive loads. For example, if the power company were experiencing a lagging current, as illustrated in FIG. 1B, then the static VAR compensator could be adjusted to provide the VARs for leading current as illustrated in FIG. 1C. The effect of combining the leading current of FIG 1C with the lagging current of FIG. 1B is to cause the current and voltage to be in phase as illustrated in FIG. 1A.

One simple method of current control is illustrated in FIG. 8, a delta modulator current regulator which applies the 3-phase line currents $i^*_A$, $i^*_B$, $i^*_C$ specified by the control waveform. The delta modulator current regulator periodically compares each desired line current $i^*_A$, $i^*_B$, $i^*_C$, with the corresponding actual line current $i_A$, $i_B$, $i_C$, sensed by sensors 100 positioned to sense the line currents from each of the switch pairs 40A,40B,40C (FIG. 5). The current comparison is accomplished using a compare device 102 for each of the lines. In the preferred embodiment, the comparisons are performed at a rate between 8 and 16 KHz, which is equivalent to a sample period between 125 or 62.5 microseconds. For each sample period, if the desired line current for a phase is greater than the actual line current, then the upper switching device is switched on and the lower switching device switched off, otherwise, the upper device is switched off and the lower device is switched on. The compare devices 102 select PWM (Pulse Width Modulation) commutation signals, $D_A$, $\overline{D}_A$, $D_B$, $\overline{D}_B$, $D_C$, and $\overline{D}_C$ that are applied to the drive circuits 47 to accomplish the desired switching. The drive circuits 47 preferably include conventional transistors and additional circuitry necessary to drive the gates of the respective IGBT switches 42, 44 in response to the on or off signal specified by the PWM commutation signals. For each sample period, a switch state is specified by the PWM commutation signals. The switch state so selected remains in effect until the next sample period, at which time the comparisons are repeated with updated actual and desired values.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A static VAR compensator for supplying reactive power to a polyphase electric power supply having a plurality of phase lines, said static VAR compensator comprising:

an energy storage device that stores energy at a constant voltage;

current regulation means, coupled to the energy storage device, for regulating the instantaneous current in each of the phase lines of the polyphase electric power supply, wherein said current regulation means includes an inverter;

means for providing a current control waveform to said current regulation means so that the current in each of the phase lines is regulated by the current control waveform;

said current control waveform having a shape to provide a selected constant number of VARs to the polyphase electric power supply, said selected constant number of VARs being substantially independent of the amount of real power provided to the polyphase electric power supply from the static VAR compensator; and voltage regulation means for regulating the voltage across the energy storage device, wherein the voltage regulation means includes:

means for forming a reference waveform from the voltage waveform of the utility grid;

means for applying the reference waveform to form a real waveform;

means for determining a multiplier as a function of the voltage across the energy storage device;

means for multiplying the multiplier by the real waveform to form a multiplied real waveform; and means for including the multiplied real waveform in the current control waveform.

2. The static VAR compensator of claim 1 wherein the current regulation means includes a delta modulator current regulator.

3. A static VAR compensator for supplying reactive power to a polyphase electric power supply having a plurality of phase lines, said static VAR compensator comprising:

current regulation means for regulating the instantaneous current in each of the phase lines of the polyphase electric power supply; and waveform means for providing a current control waveform to said current regulation means so that the current in each of the phase lines is regulated by the current control waveform, said waveform means including means for forming a reference waveform from the voltage waveform of the utility grid;

wherein the waveform means further includes:

means for rotating the reference waveform by 90° to form an imaginary waveform; and means for multiplying the imaginary waveform by a multiplier selected to provide a selected number of VARs;

said current control waveform having a shape to provide a selected constant number of VARs to the polyphase electric power supply, said selected constant number of VARs being substantially independent of the amount of real power provided to the polyphase electric power supply from the static VAR compensator.

4. The static VAR compensator of claim 3 wherein the current regulation means includes a delta modulator current regulator.

5. The static VAR compensator of claim 3 further comprising means for providing a current control waveform that provides an approximately constant power factor angle.

6. A static VAR compensator for supplying a selectable number of VARs of reactive power to a polyphase electric power supply having a plurality of phase lines, said static VAR compensator comprising:

an inverter including a plurality of switch pairs that regulate the instantaneous current, each switch pair being associated with one of said plurality of phase lines;

a voltage means for supplying a constant voltage to each switch pair in the inverter;

switch pair control means for controlling the switch pairs to provide a selected constant number of VARs to the polyphase electric power supply, said selected constant number of VARs being substantially independent of the amount of real power provided to the polyphase electric power supply, said switch pair control means including means for sensing the voltage waveforms of each of the phase lines of the polyphase electric power supply, said voltage waveform defining a reference waveform;

a control unit for providing a control waveform from the reference waveform, including means for rotating the reference waveform by 90° to form in imaginary waveform; and means for multiplying the imaginary waveform by a first multiplier selected to provide a predetermined number of VARs; and a current regulator and a drive circuit for switching said switch pairs in accordance with the control waveform;

7. The static VAR compensator of claim 6 wherein the control unit for providing a control waveform further includes:

means for forming a real waveform from the reference waveform; and means for multiplying the real waveform by a second multiplier selected to control the flow of real power through the inverter so that the voltage means supplies an approximately constant voltage.

8. The static VAR compensator of claim 7 wherein the first multiplier is selected proportional to the second multiplier to provide an approximately constant power factor angle.

9. A method for generating a current control waveform from a reference voltage waveform supplied from each phase line of a polyphase electrical power signal, said current control waveform being provided to an inverter connected between a constant voltage link and a polyphase electric power supply, said current control waveform generation method comprising the steps of:

(a) applying the reference waveform for each phase line to a provide a real waveform for each phase line;

(b) applying the reference waveform for each phase line to a provide an imaginary waveform for each phase line rotated by 90° from the reference waveform;

(c) multiplying said imaginary waveforms by a VAR multiplier to provide a multiplied imaginary waveform for each phase, wherein the VAR multiplier has a value that is indicative of the number of VARs to be supplied on the output line;

(d) multiplying the reference waveform on each phase line by a real multiplier to provide a multiplied real waveform for each phase; and (e) adding the results of said steps (c) and (d) of each phase so that, for each phase, the multiplied imaginary waveform is added to the multiplied real waveform to provide a current control waveform; and (f) controlling the instantaneous current in each phase line to approximate the current control waveform for the respective phase line.

10. The current control waveform generation method of claim 9 wherein the real multiplier has a value that is indicative of the amount of real power to be absorbed into the constant voltage link.

11. The method of claim 9, further comprising a method for selecting the real multiplier, comprising the steps of:

(g) selecting a reference constant voltage for the constant voltage link;

(h) sensing an actual voltage for the constant voltage link;

(i) providing a voltage error as the difference between the reference constant voltage and the actual voltage; and, (j) applying said voltage error to a proportional-+integral control element to select the real multiplier.

12. The method of claim 9 wherein said step (b) includes the step of converting the reference waveforms into a 2-phase form before rotating the waveforms by 90°, and following said 90° rotation of each of the two phases, converting the rotated waveforms to rotated polyphase waveforms.

13. The control waveform generation method of claim 9 wherein the imaginary multiplier in the step (c) is proportional to the real multiplier in the step (d), so that the current control waveform is indicative of an approximately constant power factor angle provided by K, the constant of proportionality between the VAR and the real multipliers.

14. The static VAR compensator of claim 6 wherein the current regulation means includes a delta modulator current regulator.

15. The static VAR compensator of claim 6 further comprising means for controlling the switch pairs to regulate the voltage means so that a selected constant voltage is maintained across said voltage means.

* * * * *